May 31, 1955 — O. R. WIKANDER — 2,709,607
ELASTIC BUSHINGS
Filed June 26, 1951

INVENTOR.
Oscar R. Wikander

United States Patent Office 2,709,607
Patented May 31, 1955

2,709,607

ELASTIC BUSHINGS

Oscar R. Wikander, Pittsburgh, Pa.

Application June 26, 1951, Serial No. 233,549

3 Claims. (Cl. 287—52)

This invention relates to means of firmly connecting rotatable cylindrical machine elements, such as shafts, pins, mandrels and the like to flywheel hubs, pulleys, gear wheels, workpieces on machine tools and the like.

These means consist of an elastic bushing, composed of two nesting helical springs, provided with co-acting contact surfaces, so arranged that a longitudinal compression of the bushing will expand the outer diameter and contract the inner diameter of the bushing, thus increasing the wall thickness of the bushing. The outer surface of the latter will bear against the surrounding bore, while its inner surface will grip the surrounded cylindrical machine element, thereby making a firm connection between them.

The features and operation of the preferred embodiment of the invention are described below and illustrated on the drawing, in which.

Figure 1:
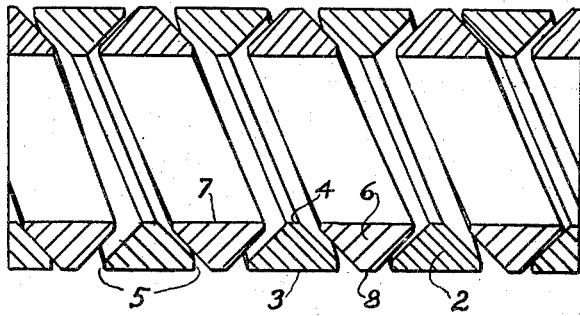
Figure 1 is a longitudinal cross section of the elastic bushing in its elongated or free condition.

Referring now more specifically to the drawing, Figure 1 shows an elastic bushing 1, having an outer helical spring 2 of triangular bar section. The base 3 of the triangle forms the outer cylindrical surface of the bushing, while its frustrated apex 4 approaches or touches the inside diameter of the fully expanded bushing. The corners 5 at the ends of the base 3 are flattened so as to bear against those of the adjacent turns if the bushing is compressed solid. The bushing 1 also has an inner helical spring 6 of preferably the same triangular bar section as the outer spring 2, so that both can be wound from the same size of bar or wire section. The base 7 of its triangular bar section forms the inner cylindrical surface of the elastic bushing 1, while its frustrated apex 8 approaches or touches the cylindrical outside surface of the fully expanded bushing.

The pitches of the nesting springs are preferably large enough so that the bars of neither spring will press against the adjacent ones of the other spring over the whole length of the free bushing. The pitches of the two nesting springs are, however, preferably so different that they will hold together at their ends, thereby making the free bushing a self contained unit, convenient to handle.

Figure 2:
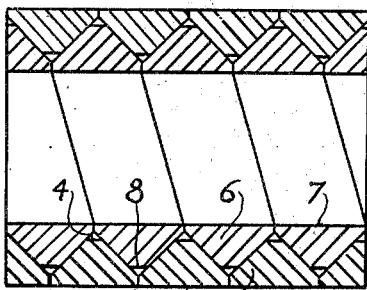
Figure 2 shows a longituidnal cross section of the same bushing when compressed solid.
Figure 3:
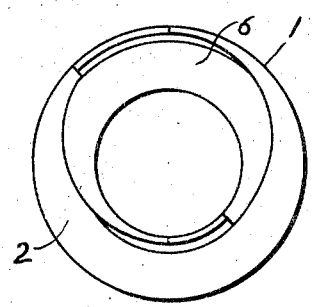
Figure 3 is an end view of the bushing as shown in Figure 2.

Figure 2 shows the bushing compressed solid with the flattened edges of the triangular cross sections of the two springs bearing against each other. In that position an additional compression force would not increase the wall thickness of the bushing. Its outside diameter is therefore beyond the range of bore diameters and its inside diameter below the range of shaft diameters, which the coupling can connect. The ends of the fully compressed bushing are shown as surfaces, perpendicular to its axis. However, if the ends are ground true in the fully expanded condition of the bushing 1, they will be slightly out of line when it is compressed.

Figure 4:
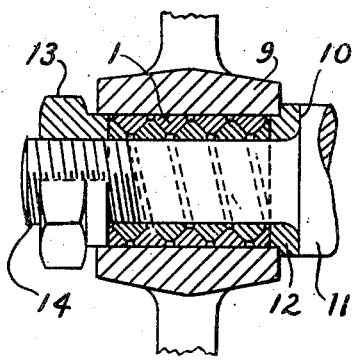
Figure 4 is a cross section of the bushing as mounted on a shaft and compressed so as to grip the surrounding bore.

Figure 4 shows a wheel hub 9, which bears against the shoulder 10 of a drive shaft 11 through a ring 12. The latter also bears against one end of the bushing 1, while the other end of the bushing is compressed by the hexagonal nut 13, which screws on the threaded end 14 of the shaft 10. Tightening of the nut 13 will cause the wall thickness of the bushing 1 to increase and firmly connect the hub 9 to the shaft 11.

Figure 5:
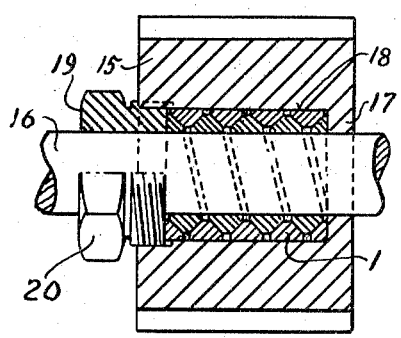
Figure 5 is a longitudinal cross section of the same bushing, installed in a wheel hub and compressed so as to grip the surrounded, plain shaft.

In Figure 5 the elastic bushing 1 is mounted inside of the bore of the pinion 15 and surrounds the plain shaft 16. One end of the bushing 1 bears against the lip 17, which extends inwardly from the bore 18 of the pinion 15, while its other end rests against a threaded sleeve 19, which has a hexagonal head 20 and surrounds the plain shaft 16. When the sleeve 19 is screwed into the threaded end of the bore 18, the bushing 1 will increase its wall thickness so as to connect the shaft 16 to the pinion 15. This connection can be broken by unscrewing the sleeve 19, which will cause the wall thickness of the elastic bushing to decrease and free the pinion from the shaft.

It will be noted that the springs of the bushing 1 are wound left hand, which feature will assist in locking the right hand threaded nut or sleeve, serving to compress it.

Other embodiments may be devised without departing from the spirit of the invention, as expressed in the claims.

I claim:

1. In combination, two concentric rotatable members, and means rotatable with said members and clamping them together for transmission of rotary power therebetween, the latter means comprising at least two helical springs disposed between said members and wound in the same direction with interengaging surfaces which co-act to force part of one spring radially outwardly against one member and part of the other spring radially inwardly against the other member when the springs are axially compressed, said springs when assembled together differing in pitch from their idle pitch before assembly so that they press against each other axially and thereby remain assembled as a unit when removed from said members, and comprising means releasably engaging the opposite ends of the springs and axially compressing the springs to hold them in tight, torque-transmitting engagement with each other and said members.

2. In combination, two concentric rotatable members, and means rotatable with said members and clamping them together for transmission of rotary power therebetween, the latter means comprising at least two helical springs disposed between said members and wound in the same direction with interengaging surfaces which wedge together to force one spring radially outwardly against one member and the other spring radially inwardly against the other member when the springs are axially compressed, said springs when assembled together differing in pitch from their idle pitch before assembly so that they press against each other axially and thereby remain assembled as a unit when removed from said members, and comprising means releasably engaging the opposite ends of the springs and axially compressing the springs to hold them in tight, torque-transmitting engagement with each other and said members.

3. In combination, two concentric rotatable members, and means rotatable with the members and clamping them together for transmission of rotary power therebetween, the latter means comprising at least two helical springs disposed between said members and wound in the same direction with interengaging surfaces which wedge together to force one spring radially outwardly against one member and the other spring radially inwardly against the other member when the springs are axially compressed, said springs differing in pitch so that they axially press against each other along portions of their wedging surfaces and thereby remain assembled as a unit when removed from said members, and comprising means releasably engaging the opposite ends of the springs and axially compressing the springs to hold them in tight, torque-transmitting engagement with each other and said members.

References Cited in the file of this patent

UNITED STATES PATENTS

| | | |
|---|---|---|
| 1,212,298 | Weston | Jan. 16, 1917 |
| 1,371,828 | Walbert | Mar. 15, 1921 |
| 2,573,928 | Peter | Nov. 6, 1951 |

FOREIGN PATENTS

| | | |
|---|---|---|
| 515,015 | France | Nov. 20, 1920 |